US010671433B2

(12) United States Patent
Singh et al.

(10) Patent No.: US 10,671,433 B2
(45) Date of Patent: Jun. 2, 2020

(54) LOAD BALANCING AND JOB SCHEDULING MANAGER WITHIN A HIGH-PERFORMANCE COMPUTING ENVIRONMENT

(71) Applicant: Tata Consultancy Services Limited, Mumbai (IN)

(72) Inventors: Piyush Kumar Singh, Indianapolis, IN (US); Prasoon Sangwan, Indianapolis, IN (US)

(73) Assignee: Tata Consultancy Services Limited, Mumbai (IN)

( * ) Notice: Subject to any disclaimer, the term of this patent is extended or adjusted under 35 U.S.C. 154(b) by 171 days.

(21) Appl. No.: 16/007,698

(22) Filed: Jun. 13, 2018

(65) Prior Publication Data

US 2018/0357104 A1 Dec. 13, 2018

Related U.S. Application Data

(60) Provisional application No. 62/518,747, filed on Jun. 13, 2017.

(51) Int. Cl.
*G06F 9/50* (2006.01)
*G06F 9/48* (2006.01)

(52) U.S. Cl.
CPC ............ *G06F 9/5027* (2013.01); *G06F 9/485* (2013.01); *G06F 9/5083* (2013.01)

(58) Field of Classification Search
CPC .................................................... G06F 9/5027
See application file for complete search history.

(56) References Cited

U.S. PATENT DOCUMENTS

| 6,950,848 | B1 | 9/2005 | Yousefi'zadeh | |
|---|---|---|---|---|
| 2013/0297801 | A1* | 11/2013 | Guest | G06F 16/958 709/226 |
| 2016/0087864 | A1* | 3/2016 | Kerpez | H04L 1/20 370/242 |

FOREIGN PATENT DOCUMENTS

CN 104253859 12/2014

* cited by examiner

*Primary Examiner* — Charlie Sun
(74) *Attorney, Agent, or Firm* — Finnegan, Henderson, Farabow, Garrett & Dunner LLP

(57) ABSTRACT

This disclosure relates generally to systems and methods for load balancing, resource allocation, and job scheduling within a high-performance computing (HPC) environment. In one implementation, the system may include a processor configured to execute instructions and a memory storing the instructions. Furthermore, the instructions may include commands to receive at least one job from a user; receive at least one preference from a user; automatically generate, in a language compatible with the load balancer, at least one command based on the at least one job and the at least one preference; transmit the at least one job and the at least one command to the load balancer; and notify the user that the received at least one job and the received at least one preference have been transmitted to the load balancer.

20 Claims, 13 Drawing Sheets

LOAD BALANCING AND JOB SCHEDULING MANAGER WITHIN A HIGH-PERFORMANCE COMPUTING ENVIRONMENT

PRIORITY CLAIM

This U.S. patent application claims priority under 35 U.S.C. § 119 to: U.S. Application No. 62/518,747, filed on 13$^{th}$ of June, 2017. The entire contents of the aforementioned application are incorporated herein by reference.

TECHNICAL FIELD

This disclosure relates generally to load balancing within a high-performance computing (HPC) environment, and more particularly to workload distribution and job scheduling amongst HPC nodes.

BACKGROUND

At present, many high-performance computing (HPC) environments allow for distribution of processor-heavy and/or memory-heavy jobs to be executed across a plurality of computing nodes. However, efficient distribution, scheduling, and monitoring of such jobs often requires many manual commands (which are generally text-based) to be fed to the load balancer of the HPC environment.

The inventors here have recognized several technical problems with such conventional systems, as explained below. Users of HPC environments are often unable to control resource distribution within the HPC environment without using manual commands. For example, users may have to use manual control of the load balancer to direct a memory-heavy job to a node with more memory and to direct a processor-heavy job to a node with faster processors.

SUMMARY

Embodiments of the present disclosure present technological improvements as solutions to one or more of the above-mentioned technical problems recognized by the inventors in conventional systems. For example, in one embodiment, a system may include a processor configured to execute instructions and a memory storing the instructions. The executed instructions may include commands to receive at least one job from a user and receive at least one preference from a user. For example, a job may include one or more commands to execute one or more computer applications or may include one or more computer-implemented scripts, e.g., a Python script or a bash script. The instructions may further include commands to automatically generate, in a language compatible with the load balancer, at least one command based on the at least one job and the at least one preference. For example, in one embodiment, if the load balancer includes Platform load sharing facility (LSF), the generated commands should be compatible with Platform LSF, or if the load balancer includes OpenLava, the generated commands should be compatible with OpenLava. The instructions may further include commands to transmit the at least one job and the at least one command to the load balancer and notify the user that the received at least one job and the received at least one preference have been transmitted to the load balancer. For example, the user may be notified via text on a screen (e.g., by displaying a confirmation message) or via a graphic displayed on a screen (e.g., by displaying a green checkmark).

By way of further example, in another embodiment, a system may include a processor configured to execute instructions and a memory storing the instructions. The executed instructions may include commands to receive at least one script from a user. For example, receiving a script may include receiving a target file location for a file having the script or receiving the text of the script directly (e.g., within a coding environment provided to the user). The instructions may further include commands to automatically generate, in a language compatible with the application for executing a script, at least one first command based on the at least one script. For example, if the script comprises a Python script, the at least one first command may comprise a command to execute the Python script. In addition, the at least one first command may include other commands, e.g., commands regarding input(s) to or output(s) from the received script.

The instructions may further include commands to receive at least one preference from a user and automatically generate, in a language compatible with the load balancer, at least one second command based on at least one preference. For example, in one embodiment, if the load balancer includes Platform LSF, the at least one second command should be compatible with Platform LSF, or if the load balancer includes OpenLava, the at least one second command should be compatible with OpenLava. The instructions may further include commands to transmit the at least one first command and the at least one second command to the load balancer and notify the user that the received at least script and the received at least one preference have been transmitted to the load balancer. For example, the user may be notified via text on a screen (e.g., by displaying a confirmation message) or via a graphic displayed on a screen (e.g., by displaying a green checkmark).

In another embodiment, a method for load balancing within a high-performance computing environment having a plurality of nodes and a load balancer is provided. The method involves: receiving, using a plurality of hardware processors, at least one job from a user; receiving, using the plurality of hardware processors, at least one preference from the user; automatically generating, in a language compatible with the load balancer, at least one command based on the at least one job and the at least one preference, using the plurality of hardware processors; transmitting the at least one job and the at least one command to the load balancer; and notifying the user that the received at least one job and the received at least one preference have been transmitted to the load balancer.

In another embodiment, a method for integrating script execution and load balancing within a high-performance computing environment having a plurality of nodes, a load balancer, and an application for executing a script is provided. The method involves: receiving at least one script from a user, using a plurality of hardware processors; automatically generating, in a language compatible with the application for executing a script, using the plurality of hardware processors, at least one first command based on the at least one script; receiving at least one preference from the user, using the plurality of hardware processors; automatically generating, in a language compatible with the load balancer, at least one second command based on at least one preference, using the plurality of hardware processors; transmitting the at least one first command and the at least one second command to the load balancer, using the plurality of hardware processors; and notifying the user that the received at least script and the received at least one preference have been transmitted to the load balancer, using the plurality of hardware processors.

In another embodiment, one or more non-transitory machine readable information storage mediums comprising one or more instructions is provided. The instructions, which when executed by one or more hardware processors, cause receiving, using a plurality of hardware processors, at least one job from a user; receiving, using the plurality of hardware processors, at least one preference from the user; automatically generating, in a language compatible with the load balancer, at least one command based on the at least one job and the at least one preference, using the plurality of hardware processors; transmitting the at least one job and the at least one command to the load balancer; and notifying the user that the received at least one job and the received at least one preference have been transmitted to the load balancer.

In another embodiment, one or more non-transitory machine readable information storage mediums comprising one or more instructions is provided. The instructions, which when executed by one or more hardware processors, cause receiving at least one script from a user, using a plurality of hardware processors; automatically generating, in a language compatible with the application for executing a script, using the plurality of hardware processors, at least one first command based on the at least one script; receiving at least one preference from the user, using the plurality of hardware processors; automatically generating, in a language compatible with the load balancer, at least one second command based on at least one preference, using the plurality of hardware processors; transmitting the at least one first command and the at least one second command to the load balancer, using the plurality of hardware processors; and notifying the user that the received at least script and the received at least one preference have been transmitted to the load balancer, using the plurality of hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 11 illustrates a fifth example GUI for the disclosed user interface device, according to some embodiments of the present disclosure.

FIG. 12 illustrates a sixth example GUI for the disclosed user interface device, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
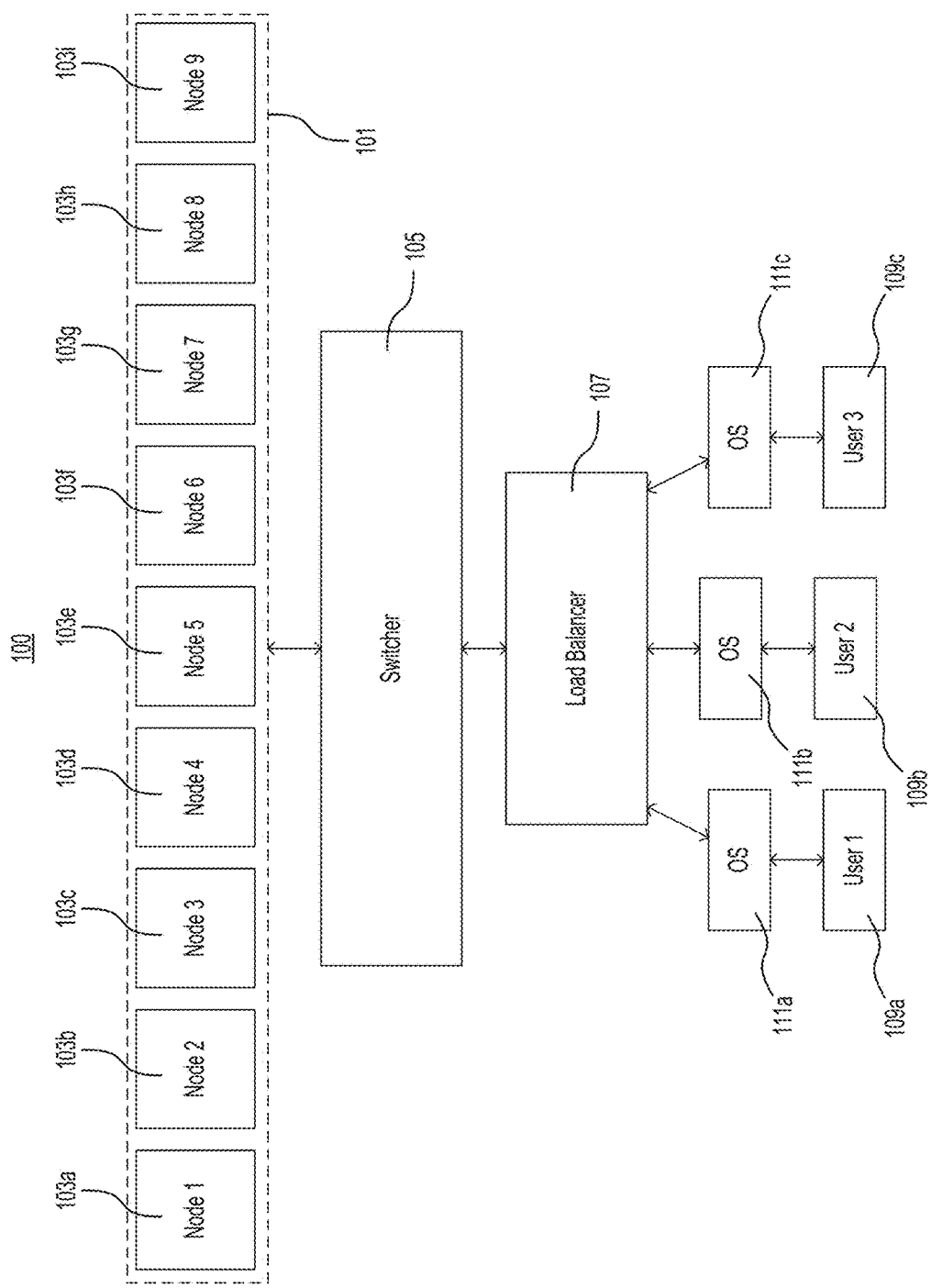
FIG. 1 illustrates a system for managing load balancing and job scheduling within a high-performance computing (HPC) environment, as known in the art.

FIG. 1 illustrates a system 100 for managing load balancing and job scheduling within a high-performance computing (HPC) environment, as known in the art. As depicted in FIG. 1, system 100 includes an HPC environment 101 having a plurality of computing nodes, e.g., nodes 103a, 103b 103c, 103d, 103e, 103f, 103g, 103h, and 103i. A computing node may include at least one processor and at least one memory operably connected to the processor. For example, a server may house one or more computing nodes and/or one or more computing nodes may be distributed across a plurality of servers. A computing node may use its associated processor(s) and memory to execute computer-implemented methods or jobs.

A computing node may further include one or more applications stored on the at least one memory for execution on the node. For example, a computing node may include MATLAB for executing MATLAB scripts, a Python interpreter for executing Python scripts, statistical analysis system (SAS) for compiling and executing SAS code, or the like.

As further depicted in FIG. 1, system 100 may include a switcher 105. For example, switcher 105 may include a media access control (MAC) bridge configured to use packet switching to receive, process, and forward data to the destination device. Although depicted as hardware in FIG. 1, switcher 105 may also include software. For example, switcher 105 may be implemented as one or more software modules included on standalone servers and/or one or more servers housing one or more of the computing nodes. In certain aspects, switcher 105 may include a combination of hardware and software.

In the illustrated embodiment, system 100 further includes a standalone load balancer 107. For example, load balancer 107 may comprise software (e.g., Platform Load Sharing Facility) executed by one or more servers in operable connection with switcher 105 and environment 101. Although depicted as standalone in FIG. 1, in other embodiments, load balancer 107 may be partially or wholly integrated with switcher 105 and/or one or more of the computing nodes, e.g., by operating on one or more servers housing one or more of the computing nodes.

In the illustrated embodiment, system 100 has three users, e.g., user 109*a*, user 109*b*, and user 109*c*. Each of the users in system 100 is in operable communication with load balancer 107 via at least one operating system. For example, user 109*a* is in connection with load balancer 107 via operating system 111*a*, user 109*b* is in connection with load balancer 107 via operating system 111*b*, and user 109*c* is in connection with load balancer 107 via operating system 111*c*. Each operating system may be housed on one or more appropriate user devices (not depicted), e.g., a smartphone, a laptop computer, a desktop computer, or the like. However, one of ordinary skill in the art would understand that environment 101 may have any number of users.

Users 109*a*, 109*b*, and 109*c* of system 100 may send jobs and commands to and receive information and statuses about jobs from load balancer 107. As depicted in FIG. 1, the users must send data to and receive data from load balancer 107 through generic tools provided by an associated operating system. For example, if user 109*a* has a device with Microsoft® Windows (operating system 111*a*), user 109*a* may have to communicate with load balancer 107 via cmd.exe or another compatible command-line interpreter. Similarly, if user 109*b* has a device with macOS® (operating system 111*b*), user 109*b* may have to communicate with load balancer 107 via the Unix shell or other compatible command-line interpreter, and if user 109*c* has a device with Linux® (operating system 111*c*), user 109*c* may also have to communicate with load balancer 107 via the Unix shell or other compatible command-line interpreter.

Similarly, a user (e.g., user 109*a*, 109*b*, or 109*c*) may have to manually manage resource distribution via a command-line interpreter. Generally, then, users of system 100 are limited to text-based communication with load balancer 107.

Figure 2:
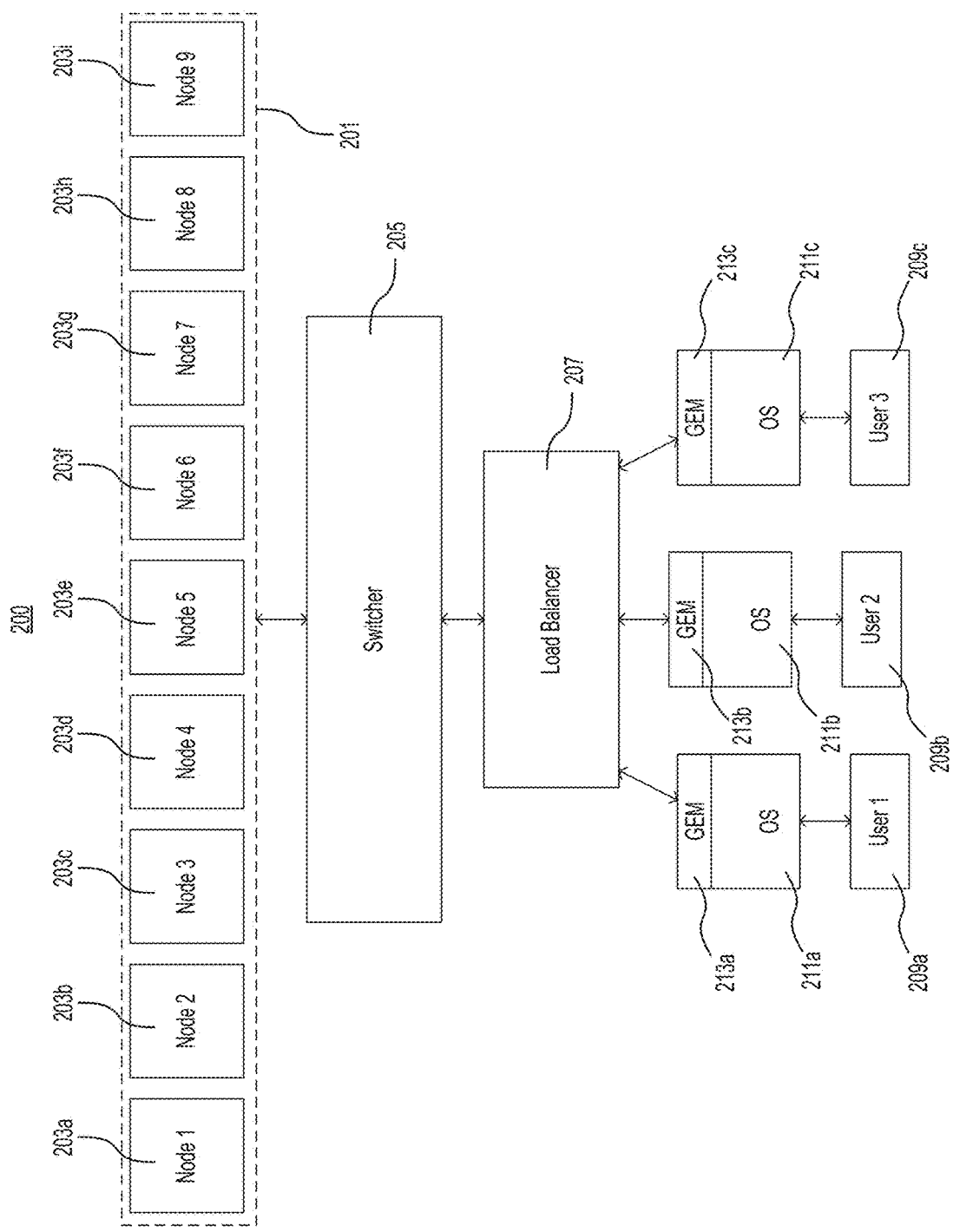
FIG. 2 illustrates an exemplary system for managing load balancing and job scheduling within an HPC environment, according to some embodiments of the present disclosure.

FIG. 2 illustrates an exemplary system 200 for managing load balancing and job scheduling within a high-performance computing (HPC) environment. System 200 includes an HPC environment 201 having a plurality of computing nodes, e.g., nodes 203*a*, 203*b* 203*c*, 203*d*, 203*e*, 203*f*, 203*g*, 203*h*, and 203*i*. The foregoing description of the HPC environment 101 of FIG. 1 and its associated nodes is similarly application to the HPC environment 201 and its associated nodes and will not be repeated here.

As further depicted in FIG. 2, system 200 may include a switcher 205. The foregoing description of switcher 105 of FIG. 1 is similarly applicable to switcher 205 and will not be repeated here. The system 200 further includes a plurality of hardware processors (not shown in the figure), and a memory storing instructions. The instructions when executed, cause the plurality of hardware processors to perform actions pertaining to different functionalities (associated with the load balancing and other associated processes) handled by each of the other components of the system 200.

In the illustrated embodiment, system 200 further includes a standalone load balancer 207. Similar to switcher 105, the foregoing description of load balancer 107 of FIG. 1 is similarly applicable to load balancer 207 and will not be repeated here.

In the illustrated embodiment, system 200 has three users, e.g., user 209*a*, user 209*b*, and user 209*c*. However, one of ordinary skill in the art would understand that the HPC environment 201 may have any number of users.

As depicted in FIG. 2, each of the users in system 200 is in operable communication with load balancer 207 via a grid execution manager (GEM). For example, user 209*a* is in connection with load balancer 207 via GEM 213*a*, user 209*b* is in connection with load balancer 207 via GEM 213*b*, and user 209*c* is in connection with load balancer 207 via GEM 213*c*. In the illustrated embodiment, each GEM operates above a corresponding operating system. For example, GEM 213*a* operates above operating system 211*a*, GEM 213*b* operates above operating system 211*b*, and GEM 213*c* operates above operating system 211*c*. In such an example, each operating system may be housed on one or more appropriate user devices (not depicted), e.g., a smartphone, a laptop computer, a desktop computer, or the like.

In other embodiments, each grid execution manager may be operable independent of an operating system and/or may be executed on a server and accessed by a user remotely, e.g., through a web browser, a VPN, or the like. For example, each grid execution manager may be accessible via one or more credentials, e.g., a password, PIN number, biometric, or other access protocol. A grid execution manager may implement an access protocol using one or more GUIs (for example, GUI 700 of FIG. 7).

Users 209*a*, 209*b*, and 209*c* of system 200 may utilize GEMs 213*a*, 213*b*, and 213*c* to send jobs and commands to and receive information and statuses about jobs from load balancer 207. For example, GEMs 213*a*, 213*b*, and 213*c* may implement example methods 300 and/or 600 of FIGS. 3 and 6.

Furthermore, in some embodiments, GEMs 213*a*, 213*b*, and 213*c* may include one or more graphical user interfaces (GUIs). For example, one or more of the example GUIs of FIGS. 7-12 may be included in GEMs 213*a*, 213*b*, and 213*c*. For most users, one or more GUIs may increase the ease with which the user(s) may communicate with the grid execution manager, both by removing the need for text-based commands and lowering the learning curve that usually accompanies one or more languages compatible with load balancers.

Moreover, in some embodiments, GEMs 213*a*, 213*b*, and 213*c* may allow users 209*a*, 209*b*, and 209*c* of system 200 to customize job scheduling, resource allocation, and the like more than allowed by load balancer 207 alone. For example, a GEM (e.g., GEM 213*a*) may allow a user (e.g., user 209*a*) to schedule a job for execution at a pre-determined future time. Similarly, a GEM (e.g., GEM 213*b*) may allow a user (e.g., user 209*b*) to schedule a job for execution when a predetermined node(s) and/or predetermined level of resources (e.g., an amount of processing capacity or an amount of memory) are available. By way of further example, a GEM (e.g., GEM 213*c*) may allow a user (e.g., user 209*c*) to schedule a job for execution when a sufficient level of resources (e.g., an amount of processing capacity or an amount of memory) are available, the sufficient level being determined by the GEM based on the job. A GEM may implement one or more of the above functionalities via one or more GUIs (for example, GUI 800 of FIG. 8).

In some embodiments, a GEM (e.g., GEM 213c) may allow a user (e.g., user 209c) to allocate resources in an inter-dependent manner. For example, the GEM may allow the user to schedule a first job for execution when a sufficient level of resources (e.g., an amount of processing capacity or an amount of memory) are available and then to schedule a second job for execution upon completion of the first job. By way of further example, the GEM (in this example, GEM 213c) may allow the user (in this case, user 209c) to schedule a first job for execution when a predetermined level of resources (e.g., an amount of processing capacity or an amount of memory) are available and then to schedule a second job for execution on the same node(s) as the first job. By way of additional example, the GEM may allow the user to schedule a first job for execution when a sufficient level of resources (the sufficient level being determined by the GEM) are available and then to schedule a second job for execution when the same level of resources as the sufficient level for the first job are available.

In certain aspects, a GEM (e.g., GEM 213a) may allow a user (e.g., user 209a) to control a workflow of a plurality of jobs. For example, the GEM may allow the user to define a preferred order of execution for the plurality of jobs. The GEM (in this example, GEM 213a) may implement this control via one or more GUIs (for example, GUI 900 of FIG. 9).

Moreover, a GEM (e.g., GEM 213b) may allow a user (e.g., user 209b) to control a workflow within a particular job; for example, the user (in this example, user 209b) may assign a processor-heavy function within a job to a different node than a memory-heavy function within the same job. By way of further example, the GEM may allow the user to define a preferred order of execution for functions within the particular job.

In certain aspects, a GEM (e.g., GEM 213a) may allow a user (e.g., user 209a) to view one or more jobs scheduled for future execution on one or more node(s). For example, the GEM (in this example, GEM 213a) may display the scheduled job information via one or more GUIs (for example, GUI 1000 of FIG. 10). In certain aspects, a GEM (e.g., GEM 213b) may allow a user (e.g., user 209b) to reschedule one or more jobs scheduled for future execution on one or more node(s). For example, the GEM (in this example, GEM 213b) may allow for the one or more jobs to be scheduled for a new time and/or may allow for the one or more jobs to be executed immediately rather than scheduled at a new time. The GEM (in this example, GEM 213b) may allow the scheduled job to be rescheduled via one or more GUIs (for example, GUI 1000 of FIG. 10).

In certain aspects, a GEM (e.g., GEM 213a) may allow a user (e.g., user 209a) to monitor a job that is executing on one or more node(s). For example, GEM 213a may provide one or more GUIs (e.g., GUI 1100 of FIG. 11) to display the status of one or more jobs. In certain aspects, a GEM (e.g., GEM 213b) may allow a user (e.g., user 209b) to pause a job that is executing on one or more node(s). Moreover, a GEM (e.g., GEM 213c) may allow a user (e.g., user 209c) to resume a job that is paused on one or more node(s). These commands may also be implemented via one or more GUIs (e.g., GUI 1100 of FIG. 11).

In certain aspects, a GEM (e.g., GEM 213a) may record status information about one or more jobs received from load balancer 207. Accordingly, the GEM (in this example, GEM 213a) may display the recorded information to a user (in this example, user 209a). Additionally, the GEM (in this example, GEM 213a) may display the recorded information via one or more GUIs (for example, GUI 1200 of FIG. 12).

Alternatively or concurrently, the GEM (in this example, GEM 213a) may transmit an email containing the recorded information to the user and/or may export the recorded information in one or more file formats (e.g., .txt, .rtf, or the like) to a user device associated with the user.

Furthermore, GEMs 213a, 213b, and 213c may implement one of more of the methods disclosed below, for example, method 300 of FIG. 3 or method 600 of FIG. 6.

Figure 3:
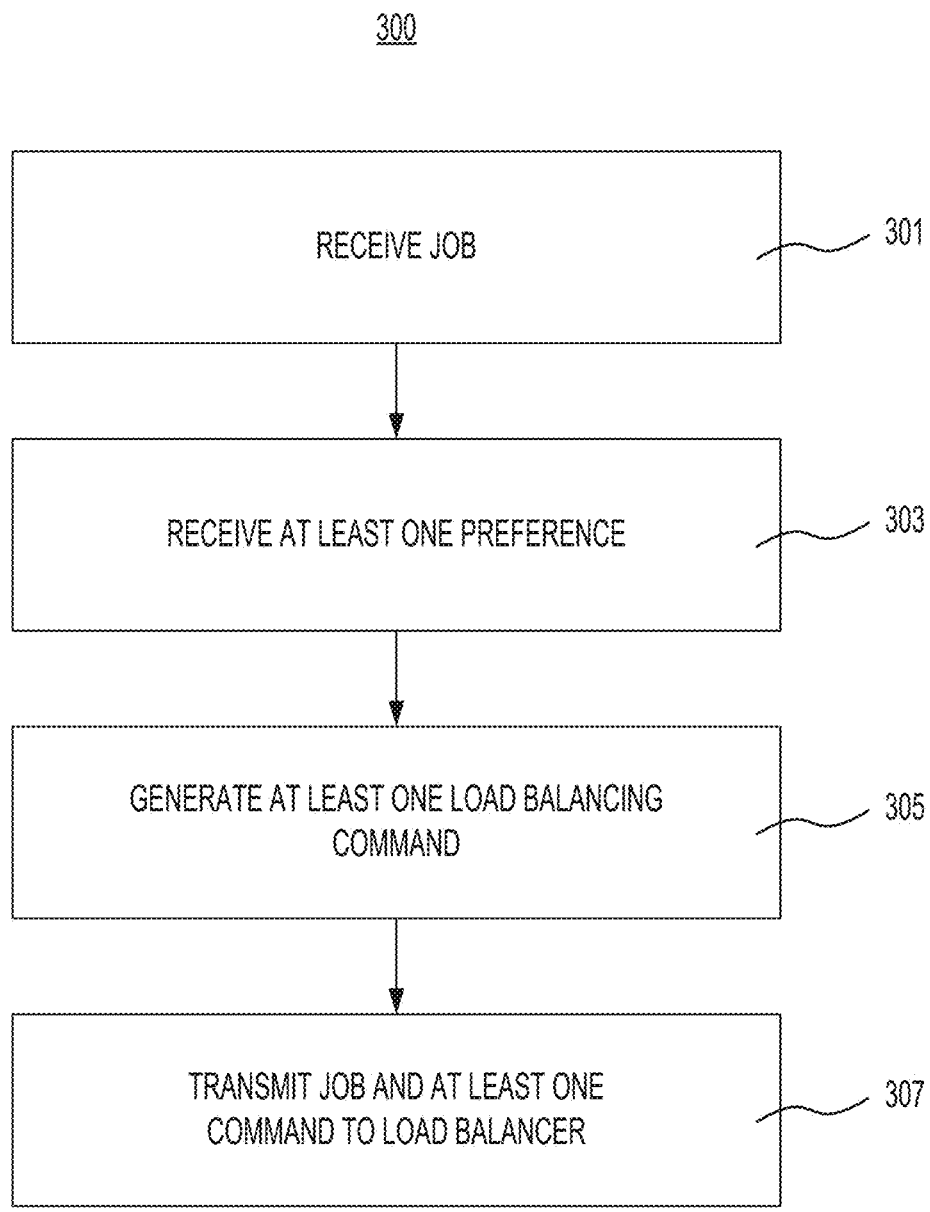
FIG. 3 illustrates an exemplary method for managing load balancing and job scheduling within an HPC environment, according to some embodiments of the present disclosure.

FIG. 3 illustrates an exemplary method 300 for load balancing within a high-performance computing (HPC) environment. Method 300 may be implemented using a grid execution manager (GEM) (e.g., GEM 213a, 213b, or 213c of FIG. 2).

At step 301, the GEM may receive a job from a user. For example, a job may include one or more commands to execute one or more computer applications. By way of further example, a job may include one or more computer-implemented scripts, e.g., a Python script or a bash script.

In some embodiments, receiving a job may include receiving one or more target file locations for one or more files containing the command(s) and/or script(s). In other embodiments, receiving a job may include receiving the text of the command(s) and/or script(s) directly. For example, the text may be extracted from one or more file(s) and/or may be placed directly in a text box or other text editor embedded within the GEM.

At step 303, the GEM may receive at least one preference from a user. For example, a preference may include a scheduled time of execution, a minimum memory requirement, a minimum processor requirement, a multithreading requirement, or the like. As used herein, "multithreading requirement" refers to either a minimum number of processors or a minimum number of nodes to be used for execution of a job.

Alternatively or concurrently, the GEM may automatically derive at least one preference from the at least one preference input by the user. For example, a user may input a preference indicating that a job should be executed on the most efficient node. The GEM may then determine which node is most efficient based on the job and the resources available on each node. By way of further example, a user may input a preference indicating that a job should be executed on two nodes in the most efficient manner. The GEM may then determine which two nodes are most efficient based on the job, possible ways of multithreading the job, and/or the resources available on each two-node combination.

At step 305, the GEM may generate at least one load balancing command. For example, the GEM may automatically generate a command that is interpretable by the load balancer (e.g., load balancer 107 or 207). A "command" may include both a main command to execute one or more jobs, as well as options appended to the main command to, for example, control input to the job(s), control output from the job(s), set calculation thresholds, set execution schedules and thresholds, and the like.

The at least one load balancing command is based on the received job(s) and the received preference(s). For example, if the GEM receives a MATLAB script as a job and a preference indicating that the job should be executed on a node with at least 8 GHz of processing power, the GEM may then automatically generate a command, in a format interpretable by the load balancer, that includes a main command to execute the MATLAB script and an option that directs the load balancer to execute the script on a node with at least 8 GHz of processing power. By way of further example, if the GEM receives a bash script as a job and a preference indicating that the job should be executed at a future time, the GEM may then automatically generate a command, in a format interpretable by the load balancer, that includes a main command to execute the bash script and an option that directs the load balancer to execute the script at the future time.

At step 307, the GEM may transmit the at least one load balancing command to the load balancer. For example, the GEM may transmit the command through a computer network, e.g., the Internet, a local area network (LAN), etc. In some embodiments, the GEM may receive a confirmation of the transmittal from the load balancer. For example, if the GEM transmits the load balancing command, the load balancer may respond with a verification signal; this process may be similar to known processes for pinging an email server.

Figure 8:
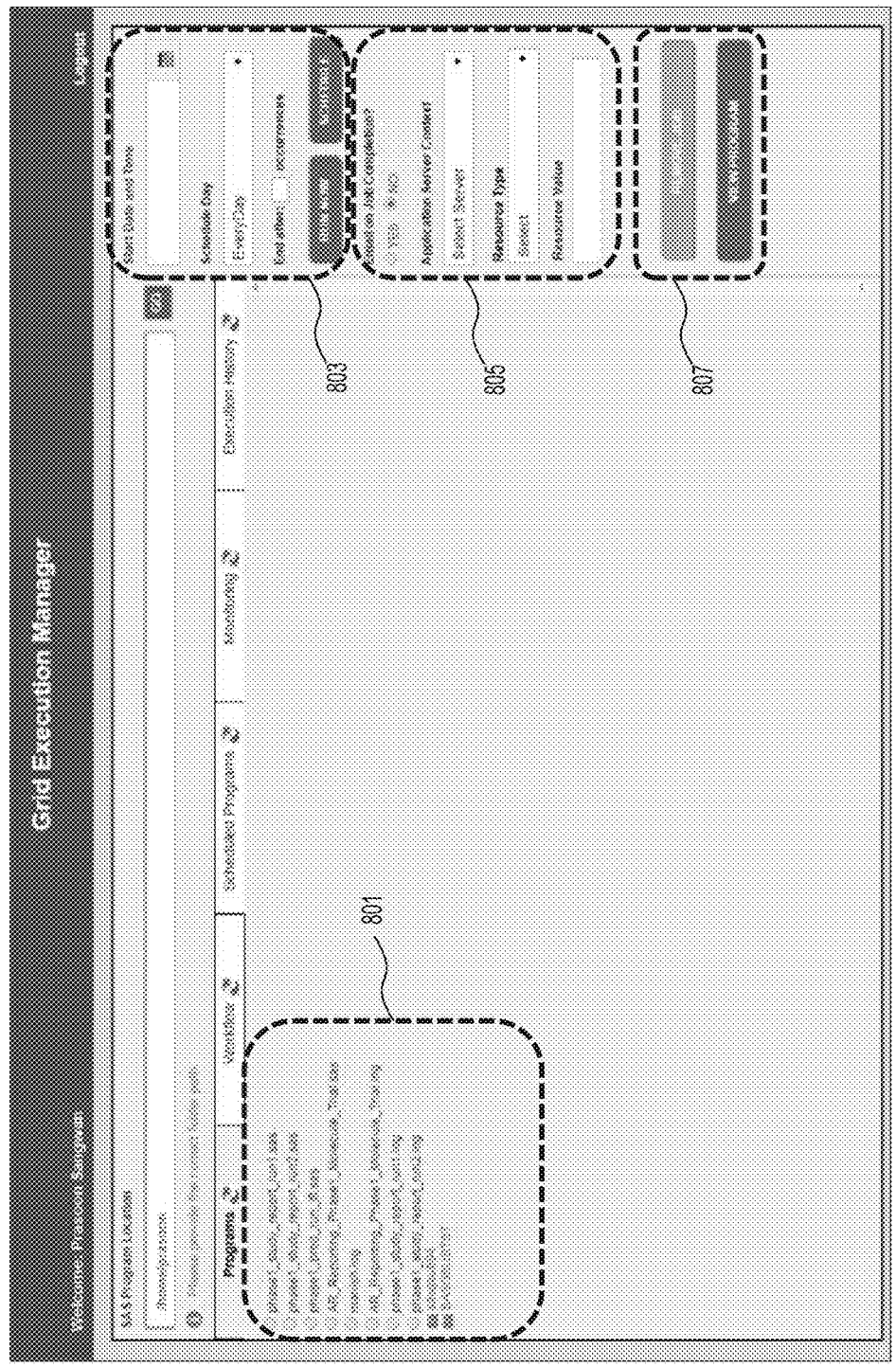
FIG. 8 illustrates a second example GUI for the disclosed user interface device, according to some embodiments of the present disclosure.

The GEM may implement one or more of steps 301, 303, 305, and 307 via one or more GUIs (for example, GUI 800 of FIG. 8).

Method 300 may include additional steps not illustrated in FIG. 3. For example, method 300 may further include notifying the user that the received job(s) and the received preference(s) have been transmitted to the load balancer. The GEM may notify the user via text or via one or more GUIs.

By way of further example, method 300 may further include authenticating a user via one or more credentials (e.g., a username and password, a PIN, biometrics, or the like) and/or transmitting an authorization to the load balancer. The GEM may implement an access protocol using one or more GUIs (for example, GUI 700 of FIG. 7).

In some embodiments, method 300 may further include a sub-method for plumbing the load balancer. For example, the sub-method may include transmitting, to the load balancer, a command for a status update related to at least one job. For example, the GEM may transmit the command through a computer network, e.g., the Internet, a local area network (LAN), etc. The sub-method may further include receiving from the load balancer, in response to the command, at least one status update associated with the at least one job. For example, if the GEM transmits a command for a status update related to a job, the load balancer may then send a signal to the GEM indicating "scheduled," "executing," "paused," "crashed," "completed," or the like. The sub-method may further including notifying the user of the received at least one status update. For example, the GEM may notify the user via text or via one or more GUIs.

In some embodiments, method 300 may further include a sub-method for altering a job via the load balancer. For example, the sub-method may include receiving an instruction to alter at least one job that is executing or scheduled for execution in the environment. For example, the GEM may receive an instruction to "pause," "resume," "terminate," "reschedule," or the like. The sub-method may further include automatically generating, in a language compatible with the load balancer, at least one command based on the received instruction. For example, if the GEM receives an instruction to pause a job, the GEM may generate a command to pause that job in a format interpretable by the load balancer. The sub-method may further include transmitting the generated command to the load balancer and notifying the user that generated command has been transmitted to the load balancer. For example, the GEM may notify the user via text or via one or more GUIs. The GEM may implement this sub-method via one or more GUIs (for example, GUI 1000 of FIG. 10 or GUI 1100 of FIG. 11).

In some embodiments, method 300 may further include a sub-method for displaying a history of a job to a user. For example, the sub-method may include receiving, from the load balancer, information related to at least one job. For example, the information may include at least one of a job identifier, a job status, an execution start time, or an execution end time. The sub-method may further include recording the received information. For example, the GEM may receive information related to a plurality of jobs, either sequentially or concurrently, and then record the received information indexed by job identifier. The sub-method may further include displaying the recorded information to the user in at least one of a table or a timeline. For example, the GEM may display the recorded information using one or GUIs (for example, GUI 1200 of FIG. 12).

Figure 4:
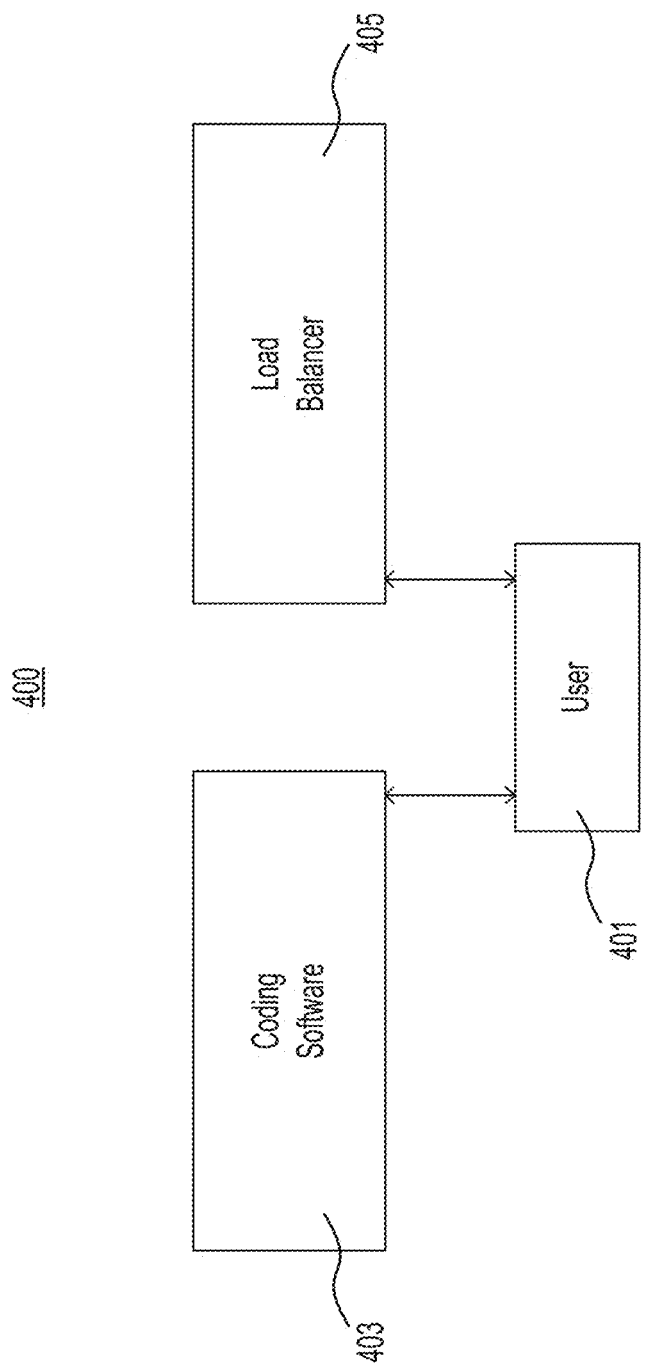
FIG. 4 illustrates a system for executing a computer script within an HPC environment, as known in the art.

FIG. 4 illustrates a system 400 for managing script execution and load balancing within a high-performance computing (HPC) environment, as known in the art. As depicted in FIG. 4, system 400 includes an HPC (not shown). The foregoing description of HPC 101 of FIG. 1 is similarly applicable to the HPC not shown in FIG. 4 and will not be repeated here.

As further depicted in FIG. 1, system 400 may include a switcher (not shown). The foregoing description of switcher 105 of FIG. 1 is similarly applicable to the switcher not shown in FIG. 4 and will not be repeated here.

In the illustrated embodiment, system 400 further includes a standalone load balancer 405. The foregoing description of load balancer 107 of FIG. 1 is similarly applicable to load balancer 405 and will not be repeated here.

In the illustrated embodiment, system 100 has one user, e.g., user 401. User 401 is in operable communication with load balancer 405; for example, user 401 may be in operable connection via at least one operating system (not shown). As further depicted in FIG. 4, user 401 is in operable communication with coding software 403. For example, coding software 403 may include a source code editor, a compiler, an integrated development environment (IDE), or the like. In one implementation, coding software 403 may include SAS, MATLAB, or the like. Moreover, one of ordinary skill in the art would understand that system 400 may have any number of users, not limited to the one illustrated user.

User 401 may send jobs and commands to and receive information and statuses about jobs from load balancer 405. User 401 may also use coding software 403 to generate, edit, compile, and/or debug one or more scripts. As depicted in FIG. 4, however, coding software 403 may require user intervention to communicate with load balancer 405. Generally, then, users of system 400 are required to manually manage the interaction between coding software 403 and load balancer 405.

Figure 5:
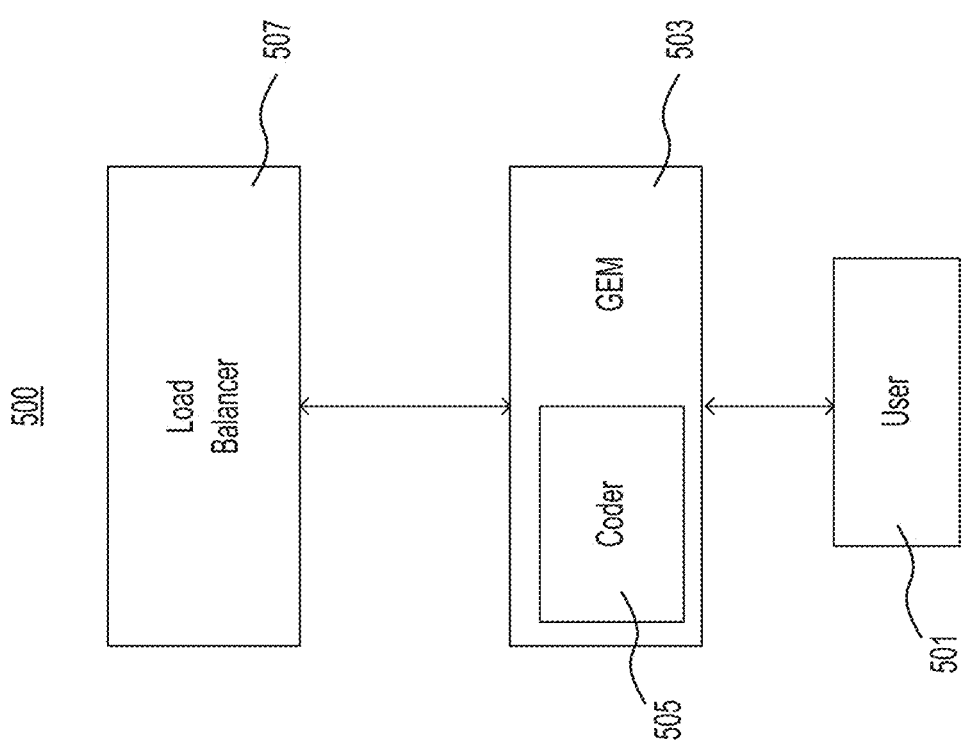
FIG. 5 illustrates an exemplary system for executing a computer script within an HPC environment, according to some embodiments of the present disclosure.

FIG. 5 illustrates an exemplary system 500 for integrating script execution and load balancing within a high-performance computing environment (HPC). System 500 includes an HPC environment (not shown). The foregoing description of HPC 101 of FIG. 1 is similarly applicable to the HPC environment not shown in FIG. 5 and will not be repeated here.

As further depicted in FIG. 5, system 500 may include a switcher (not shown). The foregoing description of switcher 105 of FIG. 1 is similarly applicable to the switcher not shown in FIG. 5 and will not be repeated here.

In the illustrated embodiment, system 500 further includes a standalone load balancer 507. The foregoing description of load balancer 107 of FIG. 1 is similarly applicable to load balancer 507 and will not be repeated here.

In the illustrated embodiment, system 500 has one user, e.g., user 501. However, one of ordinary skill in the art would understand that system 500 may have any number of users.

As depicted in FIG. 5, user 501 is in operable communication with load balancer 507 via a grid execution manager (GEM) 503. For example, GEM 503 may operate above a corresponding operating system. In such an example, the operating system may be housed on one or more appropriate user devices (not depicted), e.g., a smartphone, a laptop computer, a desktop computer, or the like.

In other embodiments, GEM 503 may be operable independent of an operating system and/or may be executed on a server and accessed by a user remotely, e.g., through a web browser, a VPN, or the like. For example, GEM 503 may be accessible via one or more credentials, e.g., a password, PIN number, biometric, or other access protocol. GEM 503 may implement an access protocol using one or more GUIs (for example, GUI 700 of FIG. 7).

In the illustrated embodiment, GEM 503 has coding software 505 integrated therein. For example, coding software 505 may include a source code editor, a compiler, an integrated development environment (IDE), or the like. In one implementation, coding software 505 may include SAS, MATLAB, or the like.

User 501 may utilize GEM 503 to send jobs and commands to and receive information and statuses about jobs from load balancer 505. For example, user 501 may send jobs and commands to and receive information and statuses about jobs from the load balancer. User 501 may also use GEM 503 to perform tasks within coding software 505, such as generating, editing, compiling, and/or debugging one or more scripts. As depicted in FIG. 4, then, user 501 may seamlessly switch tasks between coding software 505 and GEM 503 on account of the integration.

In addition, user 501 may be able to perform new tasks not previously available on account of the integration. For example, user 501 may utilize GEM 503 to generate a command for the load balancer with different preferences for different portions of a script from coding software 505. For example, a script may include one or more computer functions, and user 501 may use GEM 503 to generate a command directing one function to a first node and another function to a second node, e.g., based on differing resource requirements of each function.

Furthermore, GEM 503 may implement one of more of the methods disclosed below, for example, method 300 of FIG. 3 or method 600 of FIG. 6.

Figure 6:
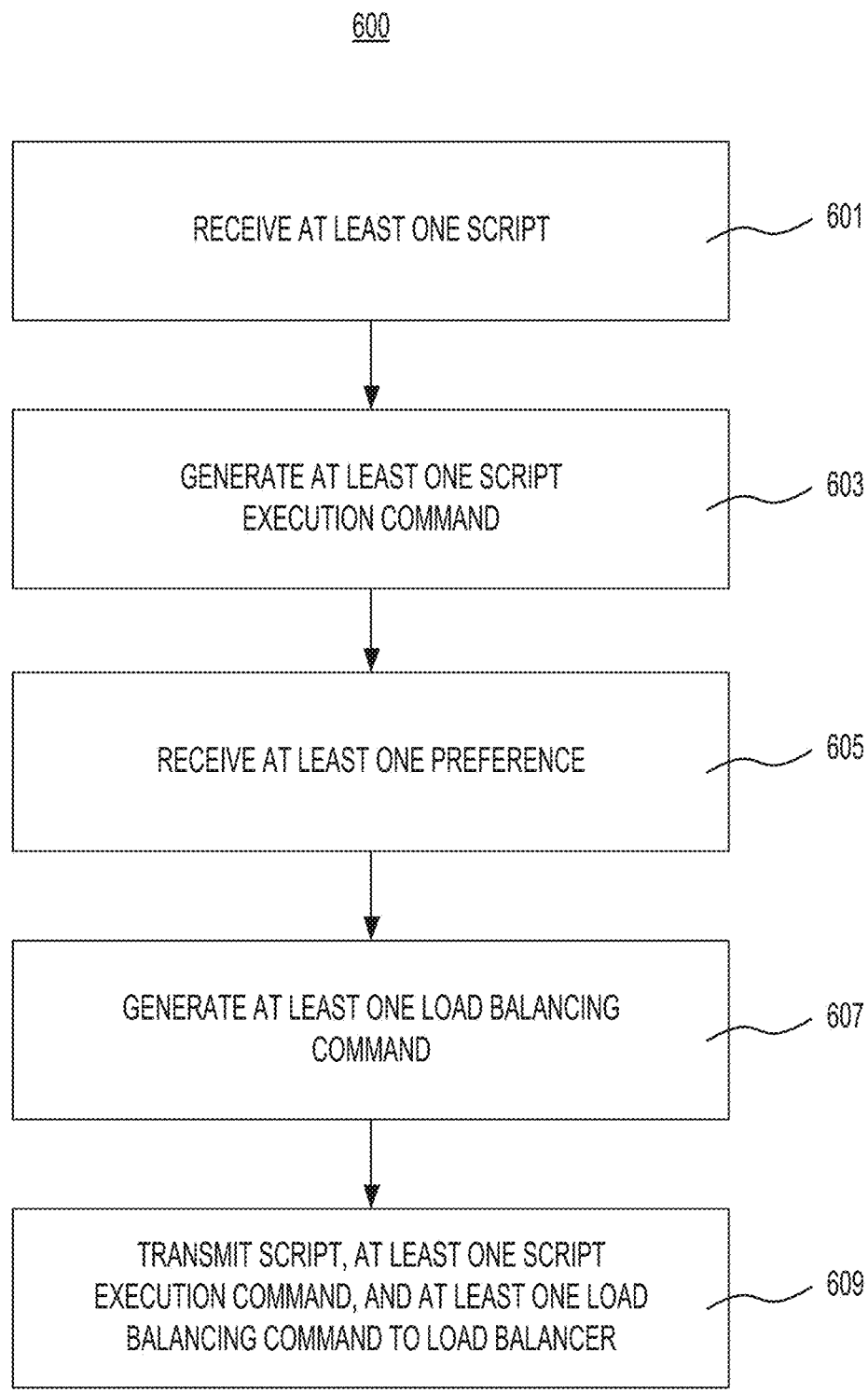
FIG. 6 illustrates an exemplary method for executing a computer script within an HPC environment, according to some embodiments of the present disclosure.

FIG. 6 illustrates an exemplary method 600 for load balancing within a high-performance computing (HPC) environment. Method 600 may be implemented using a grid execution manager (GEM) (e.g., GEM 503 of FIG. 5).

At step 601, the GEM may receive a script from a user. For example, receiving a script may include receiving a target file location for a file having the script or receiving the text of the script directly (e.g., within a coding environment provided to the user). For example, the GEM may receive the script via integrated coding software.

At step 603, the GEM may generate at least one script execution command. For example, the GEM may automatically generate a command that is interpretable by the load balancer (e.g., load balancer 405 or 507).

At step 605, the GEM may receive at least one preference from a user. For example, a preference may include a scheduled time of execution, a minimum memory requirement, a minimum processor requirement, a multithreading requirement, or the like. Alternatively or concurrently, the GEM may automatically derive at least one preference from the at least one preference input by the user. For example, a user may input a preference indicating that a script should be executed on the most efficient node; the GEM may then determine which node is most efficient based on the script and the resources available on each node. By way of further example, a user may input a preference indicating that a script should be executed on two nodes in the most efficient manner; the GEM may then determine which two nodes are most efficient based on the script, possible ways of multithreading the script, and the resources available on each two-node combination.

By way of further example, a user may input a first preference related to a first portion of the script and a second preference related to a second portion of the script. In this example, the user may input a first preference indicating that one function of the script should be executed on a first node and input a second preference indicating that another function of the script should be executed on a second node. By way of further example, the user may input a first preference indicating that one function of the script should be executed on the most efficient node and input a second preference indicating that another function of the script should be executed on the most efficient node. The GEM may then determine which node is most efficient for the first function and/or which node is most efficient for the second function.

At step 607, the GEM may generate at least one load balancing command. For example, the GEM may automatically generate a command that is interpretable by the load balancer (e.g., load balancer 405 or 507). A "command" may include both a main command to execute one or more jobs, as well as options appended to the main command to, for example, control input to the job(s), control output from the job(s), set calculation thresholds, set execution schedules and thresholds, and the like.

Accordingly, in some embodiments, the GEM may generate the command by updating the script execution command based on the received preference(s). For example, if the GEM receives a MATLAB script, generates a script execution command based on the script, and receives a preference indicating that the script should be executed on a node with at least 8 GHz of processing power, the GEM may then automatically update the command, in a format interpretable by the load balancer, that includes an option to execute the MATLAB script on a node with at least 8 GHz of processing power.

In other embodiments, the GEM may perform step 603 concurrently with step 607. For example, if the GEM receives a MATLAB script and receives a preference indicating that the script should be executed on a node with at least 8 GHz of processing power, the GEM may then automatically generate, in a format interpretable by the load balancer, a command that includes both an execution command and an option to execute the MATLAB script on a node with at least 8 GHz of processing power. Accordingly, the GEM may combine steps 603 and step 607 and perform the combination after step 605.

At step 609, the GEM may transmit the at least one script execution command and the at least one load balancing command to the load balancer. For example, the GEM may transmit the command through a computer network, e.g., the Internet, a local area network (LAN), etc. In some embodiments, the GEM may receive a confirmation of the transmittal from the load balancer. For example, if the GEM transmits the script execution command and the load balancing command, the load balancer may respond with a verification signal; this process may be similar to known processes for pinging an email server.

In some embodiments, the GEM may combine the at least one script execution command and the at least one load balancing command before transmittal. For example, the GEM may generate a command that includes both a main command and an option based on the at least one script execution command and on the at least one load balancing command.

In embodiments in which steps 603 and 607 are combined, the GEM may instead directly transmit the command that includes both a script execution command and an option to the load balancer. Following the example above, if the GEM has automatically generated, in a format interpretable by the load balancer, a command that includes both an execution command and an option to execute the received script on a node with at least 8 GHz of processing power, the GEM may, at step 609, transmit this unitary command to the load balancer.

Method 600 may include additional steps not illustrated in FIG. 6. For example, method 600 may further include notifying the user that the received script(s) and the received preference(s) have been transmitted to the load balancer. The GEM may notify the user via text or via one or more GUIs.

By way of further example, method 600 may further include authenticating a user via one or more credentials (e.g., a username and password, a PIN, biometrics, or the like) and/or transmitting an authorization to the load balancer. The GEM may implement an access protocol using one or more GUIs (for example, GUI 700 of FIG. 7).

In some embodiments, method 600 may further include a sub-method for plumbing the load balancer. The foregoing description of this sub-method with respect to FIG. 6 is similarly applicable to method 600 and will not be repeated here.

In some embodiments, method 600 may further include a sub-method for altering a job via the load balancer. (Here, the term "job" is used synonymously with "script.") The foregoing description of this sub-method with respect to FIG. 6 is similarly applicable to method 600 and will not be repeated here.

In some embodiments, method 300 may further include a sub-method for displaying a history of a job to a user. (Here, the term "job" is used synonymously with "script.") The foregoing description of this sub-method with respect to FIG. 6 is similarly applicable to method 600 and will not be repeated here.

Figure 7:
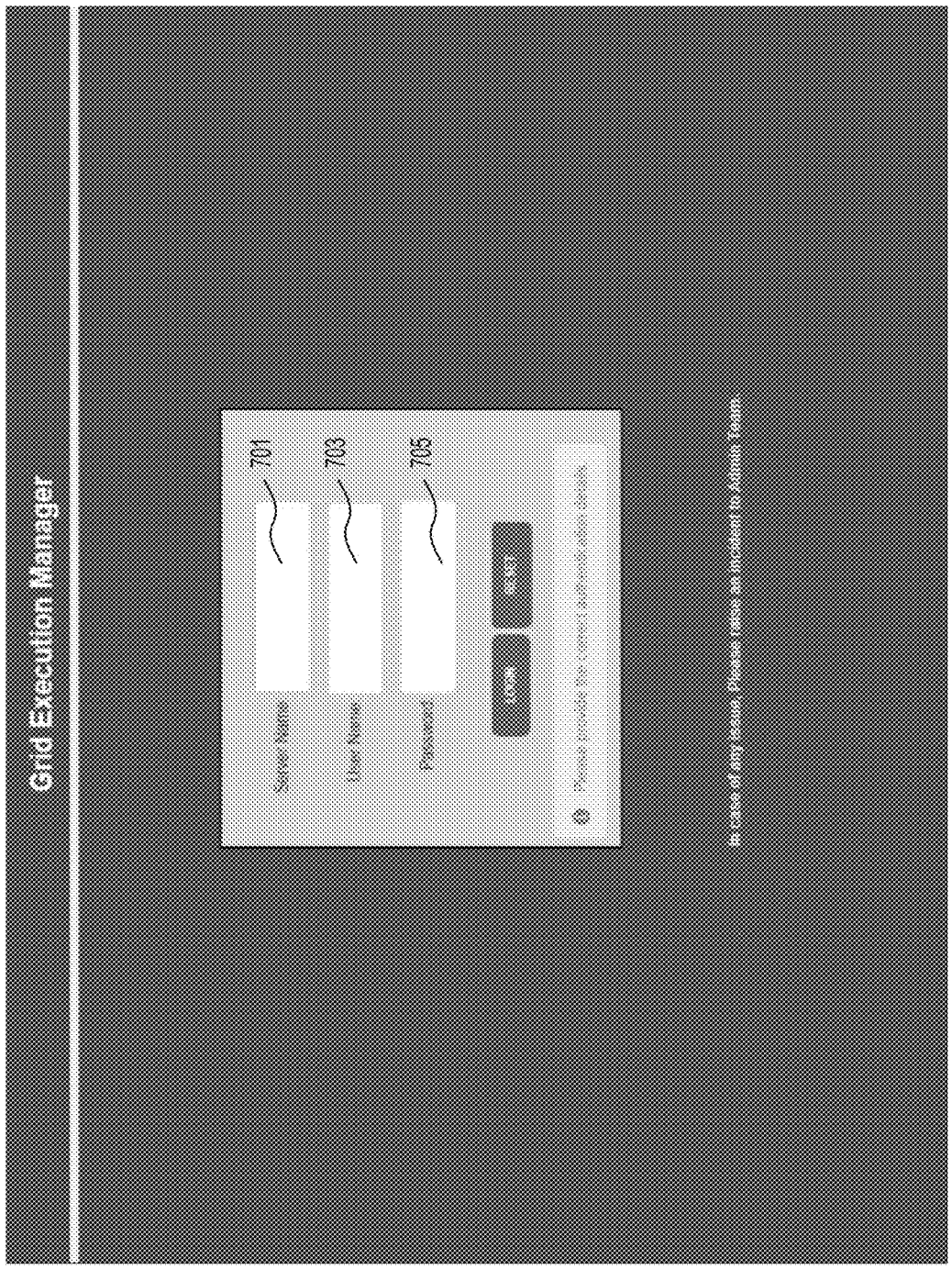
FIG. 7 illustrates a first example GUI for the disclosed systems and methods, according to some embodiments of the present disclosure.

FIG. 7 illustrates an example graphical user interface (GUI) 700 for a authenticating a user via one or more credentials (e.g., a username and password, a PIN, biometrics, or the like) and/or transmitting an authorization to a grid execution manager (GEM) in operable communication with a load balancer within a high-performance computing (HPC) environment. For example, GUI 700 may include a first screen on an operating system in operable connection with the GEM. In one implementation, the operating system may operate on a smart phone, and GUI 700 may include a start screen on an app. In another implementation, the operating system may operate on a laptop or desktop computer, and GUI 700 may include a webpage accessible through a web browser.

As depicted in GUI 700, a user may view a screen having an input 701 for a server name, an input 703 for a username, and an input 705 for a password. For example, the server name may include an identifier or a server or group of severs on which the GEM, load balancer, and/or HPC reside. Similarly, the username and password may represent credentials of one or more users that allow the user(s) to access the GEM.

As further depicted in GUI 700, a user may submit the entered server name, username, and/or password to the load balancer (or an authorization module thereof) via a "LOGIN" button. As depicted in GUI 700, a user may also clear entered information from inputs 701, 703, and/or 705 via a "RESET" button.

FIG. 8 illustrates an example graphical user interface (GUI) 800 for a disclosed grid execution manager (GEM). For example, GUI 800 may be a screen on an operating system in operable connection with the GEM. In one implementation, GUI 800 may be a screen showing a list 801 of the programs (or jobs or scripts) uploadable to a load balancer. In the example of FIG. 8, the programs are from one location ("/home/prasoon") and are in one language ("SAS"). However, GUI 800 may display any number of programs from a plurality of locations and in a plurality of computer languages.

As depicted in GUI 800, a user may use panel 803 to set a schedule for a program in list 801. For example, a user may select a program in list 801 and then set a start date and time in panel 803 for execution of the selected program. Moreover, a user may set a schedule cycle in panel 803, for example, repeating every day, repeating every week, repeating for two occurrences, or the like. As further depicted in GUI 800, a user may then use panel 803 to submit the scheduling command to the GEM using a "SCHEDULE" button. Alternatively, a user may use panel 803 to submit the program for immediate execution using a "RUN NOW" button.

As depicted in GUI 800, a user may use panel 805 to set additional options for a selected program. For example, a user may select whether the GEM should email the user after completion of the selected program. By way of further example, a user may select a particular server (or node) to use for execution of the selected program. A user may also use panel 805 to set one or more resource management options for a selected program. For example, a user may select one or more resource types and/or one or more resource values for the selected program.

As further depicted in GUI 800, a user may use panel 807 to remove a program from list 801 using a "REMOVE JOB" button. Similarly, a user may view the text of the program (or script or job) using a "VIEW PROGRAM" button. The user may view the text in a new window or in a new application (e.g., Notepad, Microsoft Word, etc.).

Figure 9:
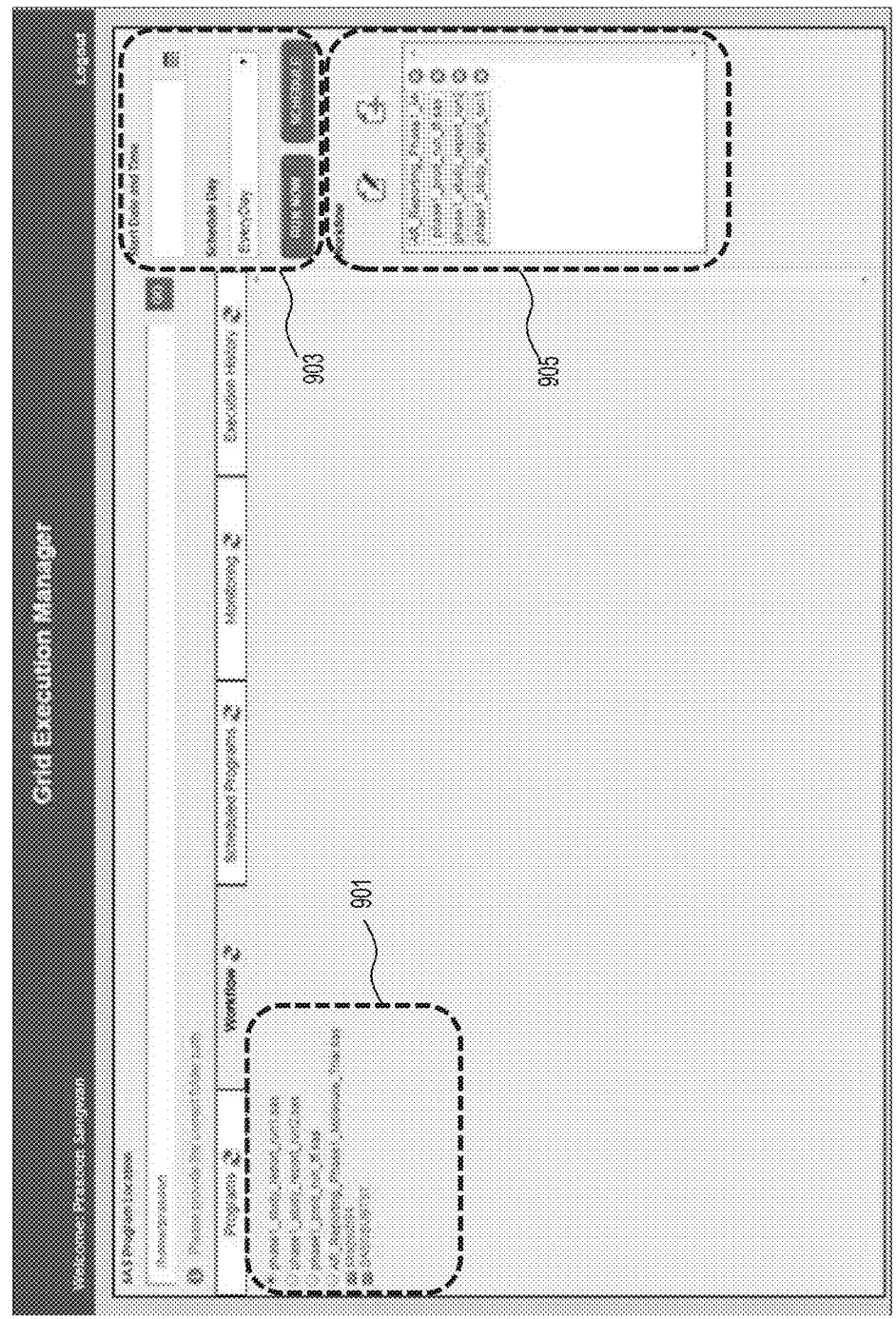
FIG. 9 illustrates a third example GUI for the disclosed user interface device, according to some embodiments of the present disclosure.

FIG. 9 illustrates a second graphical user interface (GUI) 900 for a disclosed grid execution manager (GEM). For example, GUI 900 may be a screen on an operating system in operable connection with the GEM. In one implementation, GUI 900 may be a screen showing a list 901 of a workflow. In the example of FIG. 9, the programs within the workflow are from one location ("/home/prasoon") and are in one language ("SAS"). However, GUI 900 may display any number of programs from a plurality of locations and in a plurality of computer languages.

As depicted in GUI 900, a user may use panel 903 to set a schedule for a workflow displayed in list 905. For example, a user may select a workflow from list 905 and then set a start date and time in panel 903 for execution of the selected program. Moreover, a user may set a schedule cycle in panel 903, for example, repeating every day, repeating every week, repeating for two occurrences, or the like.

As further depicted in GUI 900, a user may use panel 901 and/or panel 905 to edit the workflow displayed in list 905.

For example, the user may add one or more programs to the workflow using panel 901, remove one or more programs to the workflow using panel 905, and/or modify the order of the programs within the workflow using panel 905.

As depicted in GUI 900, a user may further use panel 903 to submit the scheduling command to the GEM using a "SCHEDULE" button. Alternatively, a user may use panel 903 to submit the program for immediate execution using a "RUN NOW" button.

Figure 10:
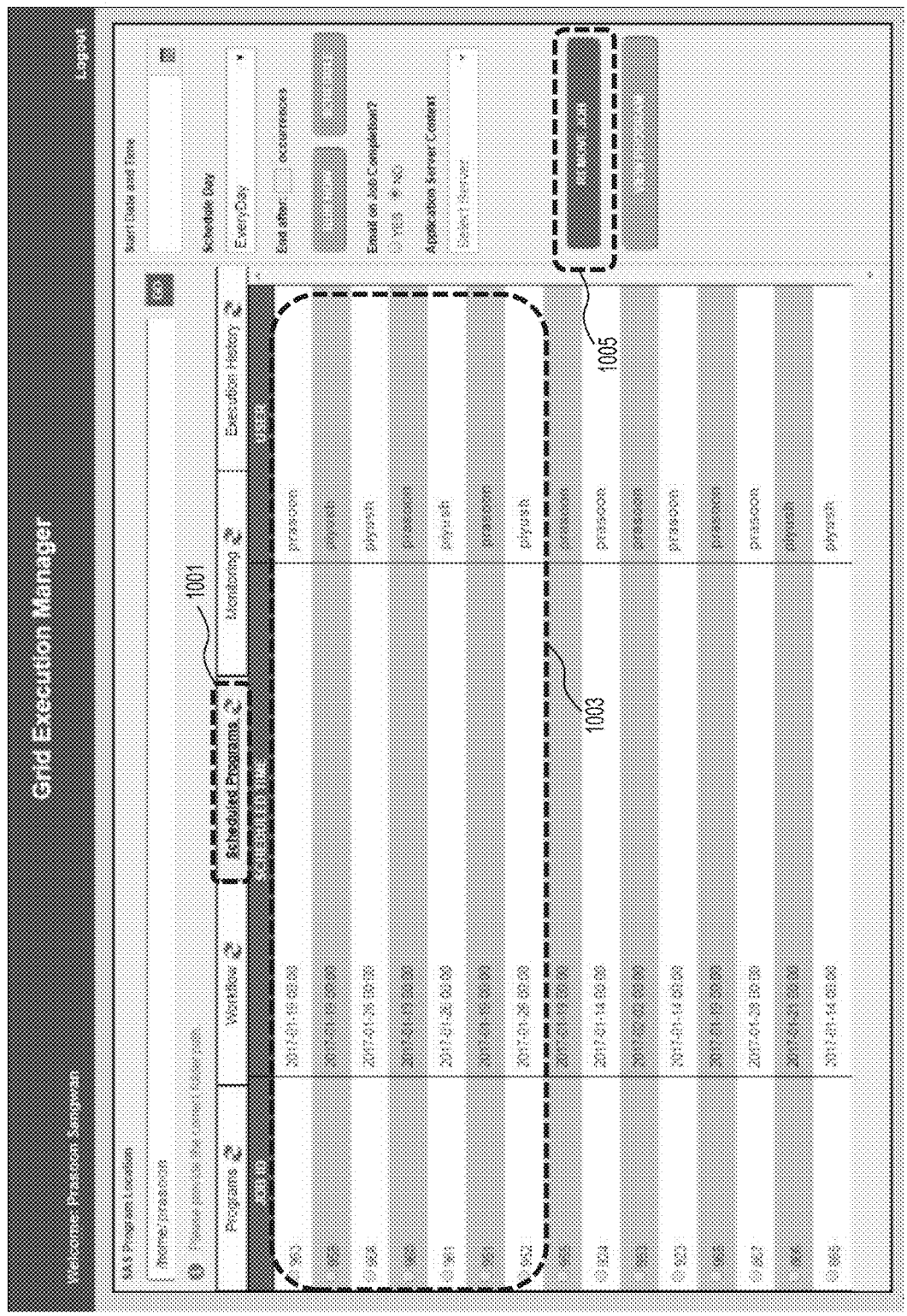
FIG. 10 illustrates a fourth example GUI for the disclosed user interface device, according to some embodiments of the present disclosure.

FIG. 10 illustrates a third example graphical user interface (GUI) 1000 for a disclosed grid execution manager (GEM). For example, GUI 1000 may be a screen on an operating system in operable connection with the GEM. In one implementation, GUI 900 may be a screen showing a list 1003 of scheduled programs on a scheduled programs tab 1001. As depicted in GUI 1000, a user may use button 1005 ("REMOVE JOB") to remove a program from list 1003. Accordingly, a user may thus prevent a scheduled job from ever executing on the HPC.

Figure 11:
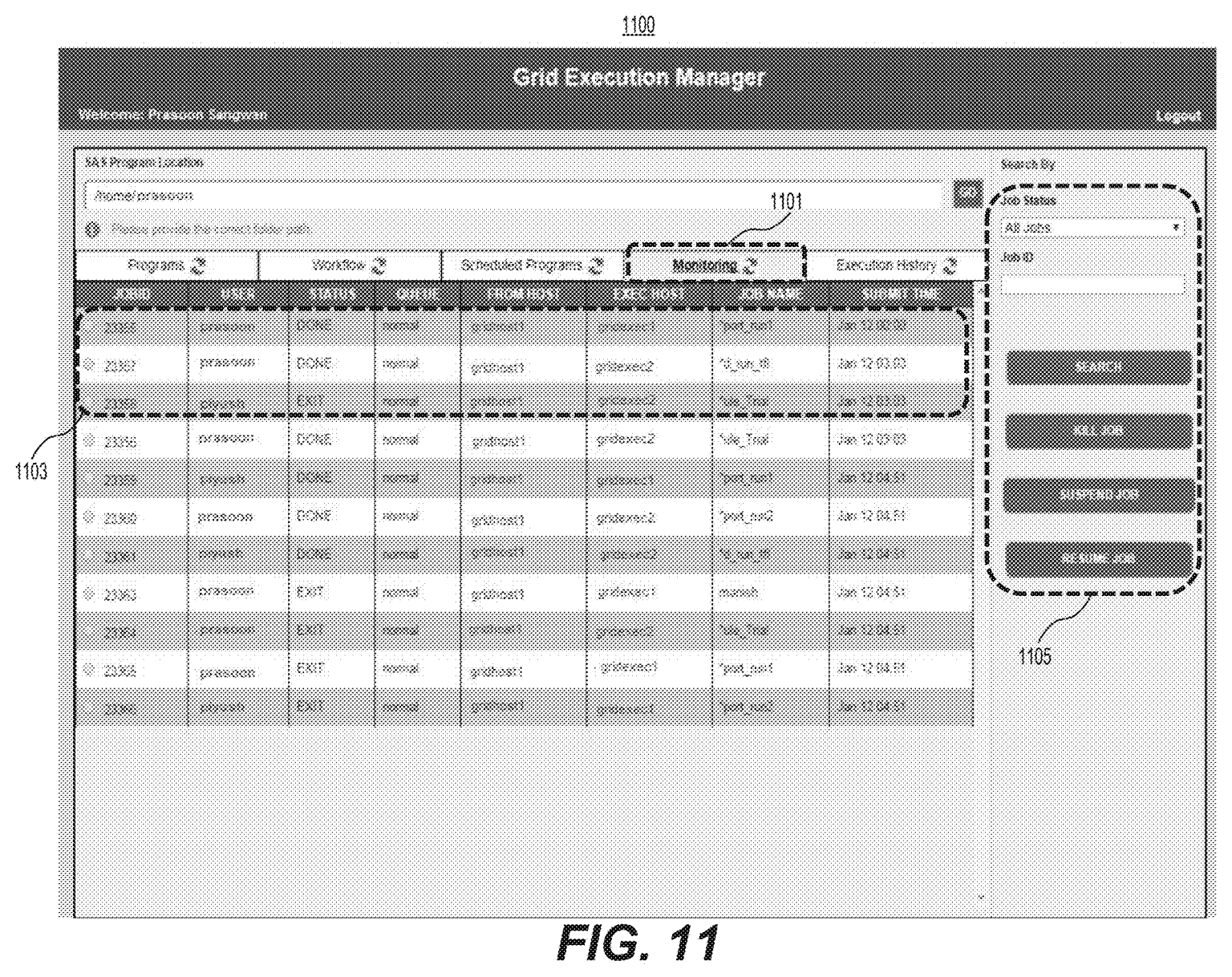

FIG. 11 illustrates a fourth example graphical user interface (GUI) 1100 for a disclosed grid execution manager (GEM). For example, GUI 1100 may be a screen on an operating system in operable connection with the GEM. In one implementation, GUI 1100 may be a screen showing a list 1103 of executing (and/or terminated and/or executed) programs on a run list tab 1101. As depicted in GUI 1100, a user may use panel 1105 to find a job on list 1103. In the illustrated embodiment, a user may search by job status or job ID. In other embodiments, a user may search by other criteria, such as job name, start time, or the like. A user may complete the search by using a "SEARCH" button.

As further depicted in GUI 1100, a user may use panel 1105 to kill (or terminate) a job executing on the HPC via a "KILL JOB" button. Similarly, a user may use panel 1105 to pause a job executing on the HPC via a "SUSPEND JOB" button. On the other hand, a user may use panel 1105 to resume a job pause on the HPC via a "RESUME JOB" button.

Figure 12:
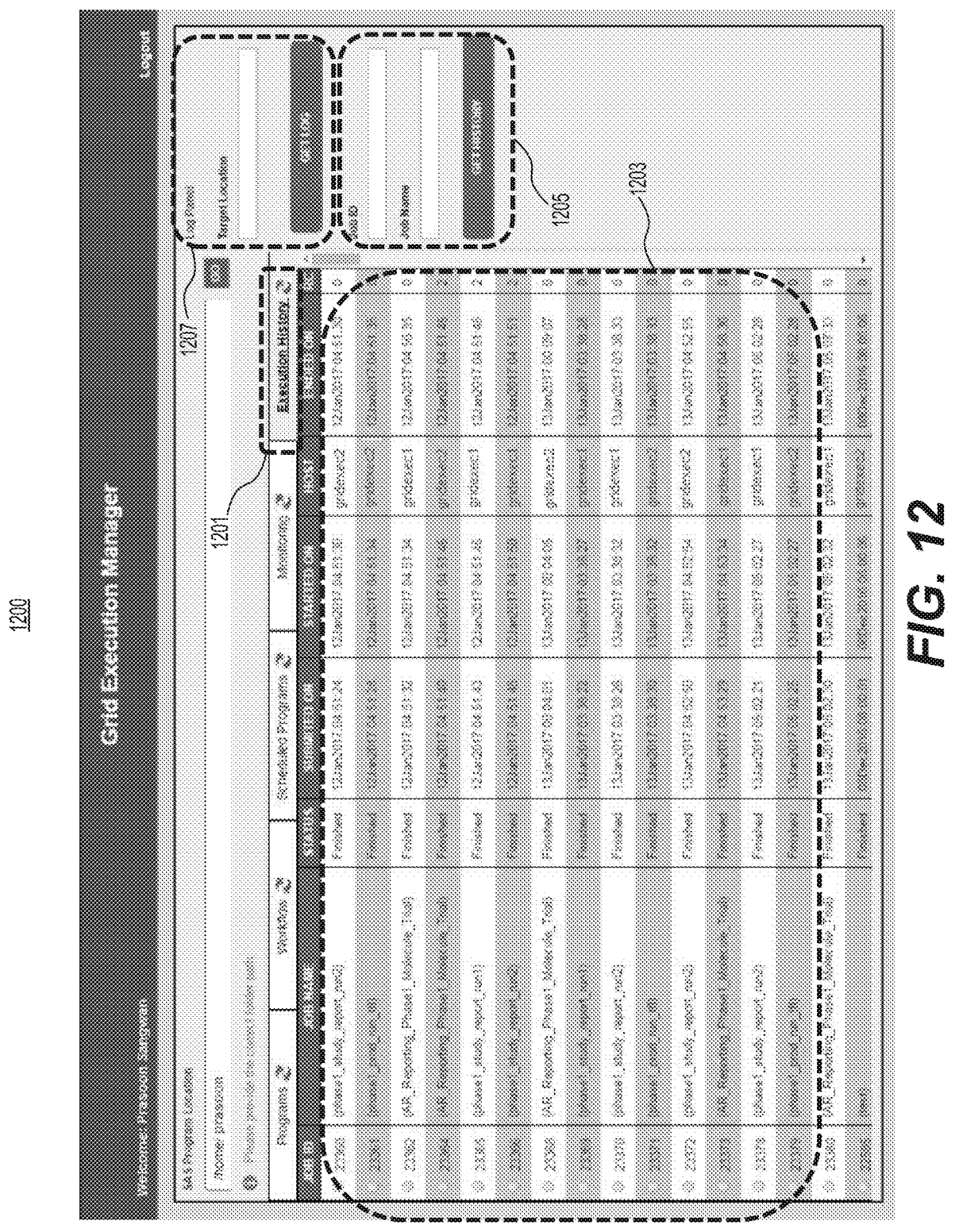

FIG. 12 illustrates a fifth example graphical user interface (GUI) 1200 for a disclosed grid execution manager (GEM). For example, GUI 1200 may be a screen on an operating system in operable connection with the GEM. In one implementation, GUI 1200 may be a screen showing a list 1203 of a history of executed (and/or terminated) programs on an execution history tab 1201. In the example of FIG. 12, the user may use panel 1205 to receive a history of a job on list 1203. In the illustrated embodiment, a user may search by job name or job ID. In other embodiments, a user may search by other criteria, such as start time or the like. A user may receive the history by using a "GET HISTORY" button.

For example, the user may receive the history via an email. Alternatively or concurrently, the user may receive one or more files (e.g., a .txt file, a .rtf file, or the like) containing the history.

As further depicted in FIG. 12, the user may use panel 1207 to receive a log of a job on list 1203. In the illustrated embodiment, a user may search by job location. In other embodiments, a user may search by other criteria, such as job name, job ID, or the like. A user may receive the log by using a "GET LOG" button.

For example, the user may receive the log via an email. Alternatively or concurrently, the user may receive one or more files (e.g., a .txt file, a .rtf file, or the like) containing the log.

Figure 13:
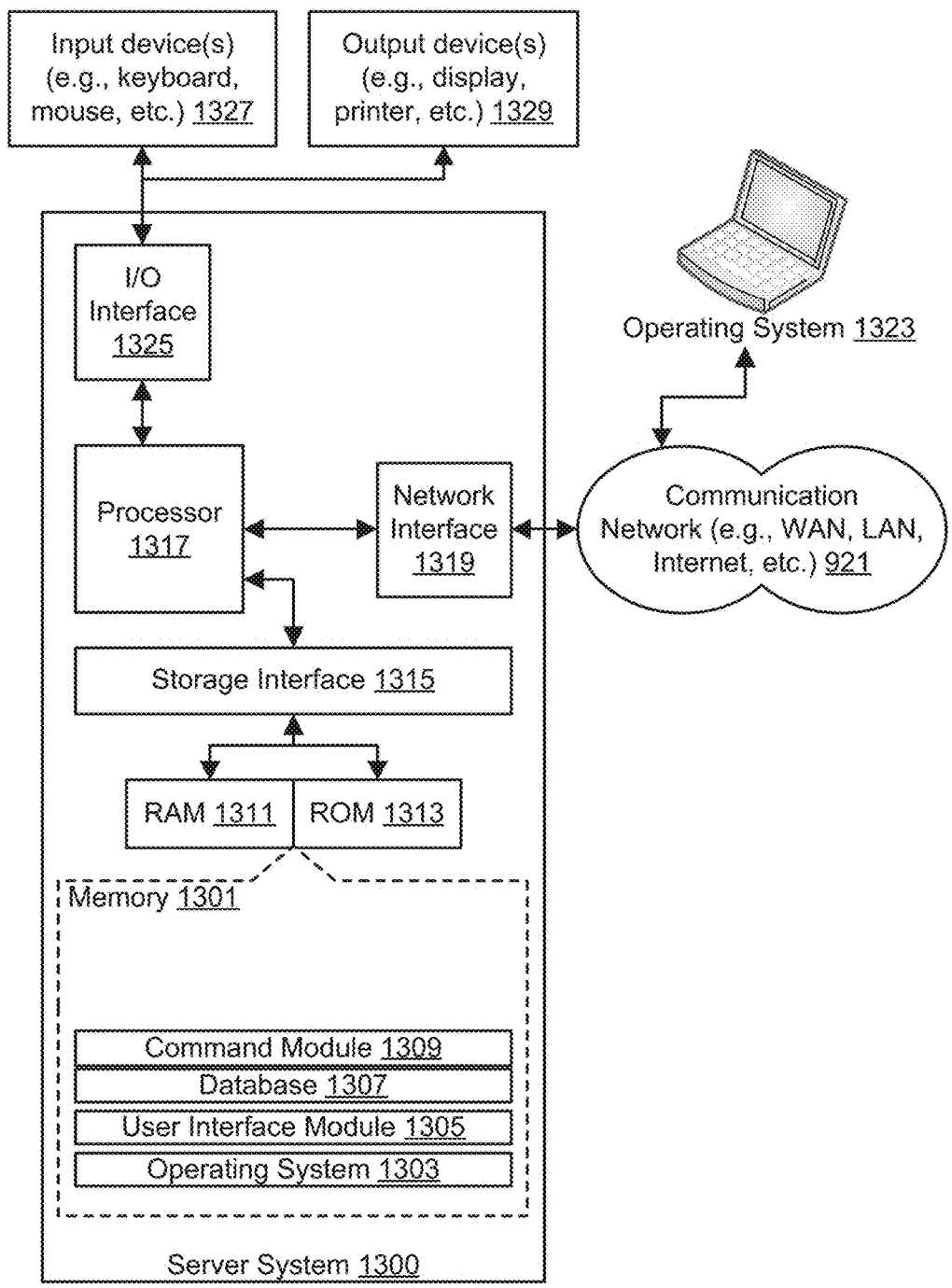
FIG. 13 is a block diagram illustrating an exemplary system for implementing the disclosed methods, according to some embodiments of the present disclosure.

FIG. 13 is a block diagram of an exemplary server system 1300 in operable communication with operating system 1323 for implementing embodiments consistent with the present disclosure. System 1300 may also be in operable communication with a load balancer (not shown) of a high-performance computing (HPC) environment. Variations of server system 1300 may be used for housing one or more grid execution managers (GEMs) disclosed herein and/or for implementing one or more of the methods disclosed herein.

Server system 1300 may include one or more memory devices, for example, memory 1301. Memory 1301 may store a collection of program or database components, including, without limitation, an operating system 1303, user interface module 1305, database 1307, command module 1309, etc. The operating system 1303 may facilitate resource management and operation of the computer system 1300. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface module 1305 may process incoming and outgoing information between server system 1300 and operating system 1323.

Memory 1301 may include, for example, RAM 1311, ROM 1313, etc. Memory 1301 may be operable connected to a storage interface 1315. Storage interface 1315 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory 1301 may be used for storing, for example, programs corresponding to the methods disclosed herein and/or outputs of the methods provided herein.

Server system 1300 may further include a central processing unit ("CPU" or "processor") 1317. Processor 1317 may include at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 1317 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, processor 1317 may be disposed in communication with a communication network 1321 via a network interface 1319. The network interface 1319 may communicate with the communication network 1321. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1321 may include, without limitation, a direct interconnection, local area network (LAN), wide area network (WAN), wireless network (e.g., using Wireless Application Protocol), the Internet, etc. Using network interface 1319 and communication network 1321, server system 1300 may communicate with operating system 1323. A user may communication with server system 1300 via operating system 1323 using an associate device, such as a personal computer(s), various mobile devices such as cellular telephones, smartphones (e.g., AppleiPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, server system 1300 may itself embody one or more of these devices.

Processor 1317 may be disposed in communication with one or more input/output (I/O) devices via I/O interface 1325. I/O interface 1325 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1325, server system 1300 may communicate with one or more I/O devices. For example, the input device 1327 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1329 may be a printer, fax machine, video display (e.g., cathode ray tube (CRT), liquid crystal display (LCD), light-emitting diode (LED), plasma, or the like), audio speaker, etc.

In some embodiments, execution of the sequences of instructions may be performed by a single computer system. In other embodiments, two or more computer systems may be coupled to perform the sequence of instructions in coordination with one another. The illustrated system may transmit and receive messages, data, and instructions, including program code (i.e., application code) through, for example, input device 1327. Received program code may be executed by processor 1317 as it is received, and/or stored in a disk drive, or other non-volatile storage for later execution. Additionally, in the same embodiments or other embodiments, the server, messaging and instructions transmitted or received may emanate from hardware, including operating system, and program code (i.e., application code) residing in a cloud implementation.

Further, it should be noted that one or more of the systems and methods provided herein may be suitable for cloud-based implementation. For example, in some embodiments, some or all of the data used in the disclosed methods may be sourced from or stored on any cloud computing platform.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for load balancing within a high-performance computing environment having a plurality of nodes and a load balancer, comprising:
   a processor configured to execute instructions; and
   a memory storing the instructions, wherein the instructions when executed by the processor, cause the processor to:
   receive at least one job from a user;
   receive at least one preference from the user;
   automatically generate, in a language compatible with the load balancer, at least one command based on the at least one job and the at least one preference;
   transmit the at least one job and the at least one command to the load balancer; and
   notify the user that the received at least one job and the received at least one preference have been transmitted to the load balancer.

2. The system of claim 1, wherein the at least one preference comprises at least one of a scheduled time of execution, a minimum memory requirement, a minimum processor requirement, or a multithreading requirement.

3. The system of claim 1, wherein the processor is further configured to execute the instructions to:
   transmit, to the load balancer, a command for a status update related to the at least one job;
   receive from the load balancer, in response to the command, at least one status update associated with the at least one job; and
   notify the user of the received at least one status update.

4. The system of claim 1, wherein the at least one preferences comprises a plurality of preferences, and at least two of the plurality of preferences are inter-dependent.

5. The system of claim 1, wherein the processor is further configured to execute the instructions to:
receive an instruction to alter at least one job that is executing or scheduled for execution in the environment;
automatically generate, in a language compatible with the load balancer, at least one command based on the received instruction;
transmit the generated command to the load balancer; and
notify the user that generated command has been transmitted to the load balancer.

6. The system of claim 5, wherein the at least one job comprises a job that is executing, and the instruction to alter at least one job comprises at least one of an instruction to terminate the executing job or an instruction to pause execution of the executing job.

7. The system of claim 6, wherein the processor is further configured to execute the instructions to:
receive an instruction to resume at least one job that is paused;
automatically generate, in a language compatible with the load balancer, at least one command based on the received instruction;
transmit the generated command to the load balancer; and
notify the user that generated command has been transmitted to the load balancer.

8. The system of claim 5, wherein the at least one job comprises a job that is scheduled, and the instruction to alter at least one job comprises at least one of an instruction to immediately execute the scheduled job or an instruction to reschedule execution of the scheduled job.

9. The system of claim 1, wherein the processor is further configured to execute the instructions to:
receive, from the load balancer, information related to the at least one job, wherein the information comprises at least one of a job identifier, a job status, an execution start time, or an execution end time;
record the received information; and
display the recorded information to the user in at least one of a table or a timeline.

10. A system for integrating script execution and load balancing within a high-performance computing environment having a plurality of nodes, a load balancer, and an application for executing a script, the system comprising:
a processor configured to execute instructions; and
a memory storing the instructions that, when executed by the processor cause the processor to:
receive at least one script from a user;
automatically generate, in a language compatible with the application for executing a script, at least one first command based on the at least one script;
receive at least one preference from the user;
automatically generate, in a language compatible with the load balancer, at least one second command based on at least one preference;
transmit the at least one first command and the at least one second command to the load balancer; and
notify the user that the received at least script and the received at least one preference have been transmitted to the load balancer.

11. The system of claim 10, wherein receiving at least one script comprises receiving a target file location for a file having the script.

12. The system of claim 10, wherein receiving at least one script comprises receiving the text of the script directly.

13. The system of claim 10, wherein the first command and the second command comprise a single command.

14. The system of claim 10, wherein the at least one preference comprises at least one of a scheduled time of execution, a minimum memory requirement, a minimum processor requirement, or a multithreading requirement.

15. The system of claim 10, wherein the at least one preference comprises at least two preferences, a first preference being related to a first portion of the script and a second preference being related to a second portion of the script.

16. A method for load balancing within a high-performance computing environment having a plurality of nodes and a load balancer, comprising:
receiving, using a plurality of hardware processors, at least one job from a user;
receiving, using the plurality of hardware processors, at least one preference from the user;
automatically generating, in a language compatible with the load balancer, at least one command based on the at least one job and the at least one preference, using the plurality of hardware processors;
transmitting the at least one job and the at least one command to the load balancer, using the plurality of hardware processors; and
notifying the user that the received at least one job and the received at least one preference have been transmitted to the load balancer, using the plurality of hardware processors.

17. The method of claim 16, further comprising:
receiving an instruction to alter at least one job that is executing or scheduled for execution in the environment, using the plurality of hardware processors;
automatically generating, in a language compatible with the load balancer, at least one command based on the received instruction, using the plurality of hardware processors;
transmitting the generated command to the load balancer, using the plurality of hardware processors; and
notifying the user that generated command has been transmitted to the load balancer, using the plurality of hardware processors.

18. A method for integrating script execution and load balancing within a high-performance computing environment having a plurality of nodes, a load balancer, and an application for executing a script, comprising:
receiving at least one script from a user, using a plurality of hardware processors;
automatically generating, in a language compatible with the application for executing a script, using the plurality of hardware processors, at least one first command based on the at least one script;
receiving at least one preference from the user, using the plurality of hardware processors;
automatically generating, in a language compatible with the load balancer, at least one second command based on at least one preference, using the plurality of hardware processors;
transmitting the at least one first command and the at least one second command to the load balancer, using the plurality of hardware processors; and
notifying the user that the received at least script and the received at least one preference have been transmitted to the load balancer, using the plurality of hardware processors.

19. One or more non-transitory machine readable information storage mediums comprising one or more instructions which when executed by one or more hardware processors cause:
- receiving at least one job from a user;
- receiving at least one preference from the user;
- automatically generating, in a language compatible with the load balancer, at least one command based on the at least one job and the at least one preference;
- transmitting the at least one job and the at least one command to the load balancer; and
- notifying the user that the received at least one job and the received at least one preference have been transmitted to the load balancer.

20. One or more non-transitory machine readable information storage mediums comprising one or more instructions which when executed by one or more hardware processors cause:
- receiving at least one script from a user;
- automatically generating, in a language compatible with the application for executing a script at least one first command based on the at least one script;
- receiving at least one preference from the user;
- automatically generating, in a language compatible with the load balancer, at least one second command based on at least one preference;
- transmitting the at least one first command and the at least one second command to the load balancer; and
- notifying the user that the received at least script and the received at least one preference have been transmitted to the load balancer.

* * * * *